Patented Nov. 4, 1924.

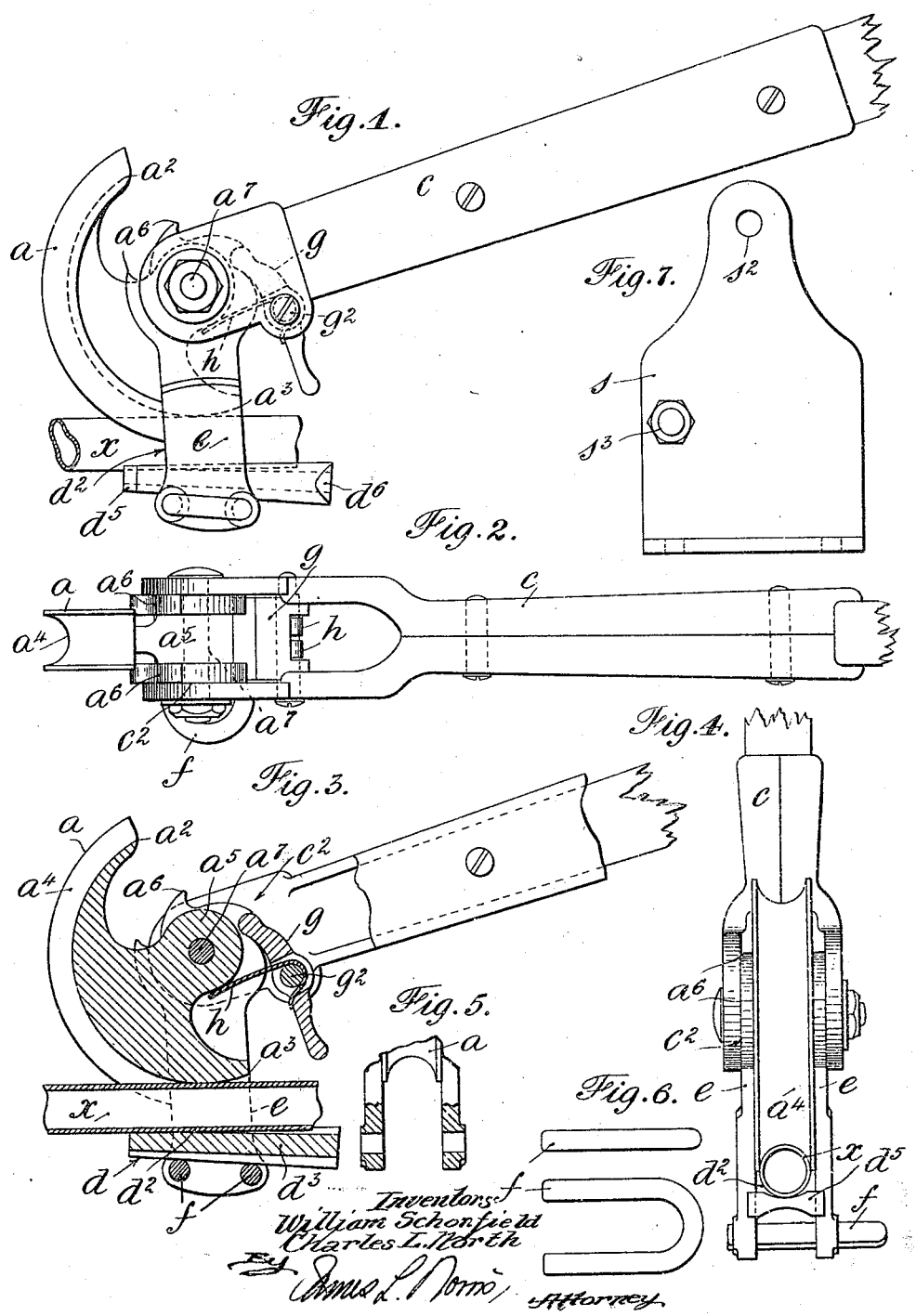

1,514,467

UNITED STATES PATENT OFFICE.

WILLIAM SCHONFIELD, OF LONDON, AND CHARLES LOUIS NORTH, OF HAMPSTEAD, LONDON, ENGLAND; SAID NORTH ASSIGNOR TO SAID SCHONFIELD.

TUBE OR ROD BENDING APPLIANCE.

Application filed November 4, 1922. Serial No. 599,047.

*To all whom it may concern:*

Be it known that we, WILLIAM SCHONFIELD, a subject of the King of Great Britain, residing at 22 Great St. Andrew Street, Shaftesbury Avenue, London, W. C. 2, England, and CHARLES LOUIS NORTH, a subject of the King of Great Britain, residing at 24 Achilles Road, Hampstead, London, N. W. 3, England, have invented certain new and useful Improvements in Tube or Rod Bending Appliances, of which the following is a specification.

The invention provides a convenient appliance for bending tubes or rods and affords a portable appliance for bending such tubes or rods in position, such, for example, as tubes used in laying electrical conduits. Said appliance is intended to be carried as part of a workman's kit, and to be used on a tube or rod which is already in place for the purpose of putting bends in it as such are desired.

Said appliance comprises a segmental former, a levering handle for rolling said former along said tube or the like during the bending operation, and a grip to hold the tube or the like to the former while being bent. Preferably there is a ratchet or clutch action between the handle and the former in order that said handle may be operated in varying operative positions relative to the former. The grip is also preferably a friction one and may conveniently be provided by a wedging piece carried in an eye of the former, and said piece may be detached by opening the eye temporarily.

Constructionally, the former is grooved on its periphery or so shaped as to support the tube transversely. The grip is at one end of the former. The handle may have a forked inner end swinging upon a centre pin of the segmental former, the latter operating between the branches of the fork and carrying ratchet teeth with which a pawl carried by the forked end engages.

The invention will be clearly understood from the following description with reference to the accompanying drawings, wherein—

Figure 1 is a side elevation of the appliance,

Fig. 2 is a plan view,

Fig. 3 is a side section,

Fig. 4 is an end elevation, and

Figs. 5 and 6 show details.

A bracket, represented in Fig. 7, is attachable to a bench or other surface and serves to support the appliance when used on a bench for bending, such bracket, when used, necessitating only a longer centre pin.

The segmental former $a$ extends from $a^2$ to $a^3$, and is grooved on its periphery at $a^4$ to the size and shape of the tube $x$ or the like to be bent. As shown, it is a segment of a circular body, but it may be of other shape, such as part of an elliptical body. The former is formed with a central boss $a^5$ and ratchet teeth $a^6$ are formed on said boss for engagement by a ratchet tooth $g$ carried by the levering handle $c$, hereinafter described, for which purpose said former is fitted with a detachable centre pin $a^7$ on which the levering handle swings.

A grip $d$ for holding the tube or rod in engagement with the end $a^3$ of the former is supported adjacent said end of the former by a pair of parallel arms $e$ which extend from the boss $a^5$ toward and beyond said end $a^3$. These arms $e$ form a fork to straddle the pipe or tube, and a gripping wedge $d^3$ is supported by a U-shaped cotter $f$ having its arms extending through a pair of apertures in the free ends of the arms $e$. The wedge $d^3$ is slidable between the arms $e$ and upon the cotter $f$ in a direction parallel to a line tangent to the former at the point of engagement of the latter with the tube or pipe, and said wedge engages the tube or pipe at a point diametrically opposite to the point at which the end $a^3$ of the former engages such tube or pipe. The apparatus is applied to a tube or rod to be bent either by inserting the free end of the tube or pipe between the arms $e$ of the fork and between the end $a^3$ of the former and the wedge $d^3$. Or the cotter $f$ and wedge $d^3$ may be removed from the arms $e$ and the former may be then placed over the tube with the arms $e$ straddling the tube and the wedge $d^3$ and cotter $f$ may then be replaced. The tube is thus gripped between the groove of the former and the wedge, as the bending stresses are applied, and as the bending proceeds the apparatus can be moved along the tube to different positions. The wedge $d^3$ is formed with stop ends $d^5$, $d^6$ to prevent it leaving the fork, but the end of the fork may be opened to remove the wedging piece from said fork by the withdrawal of the U-shaped cotter $f$ from the opposite holes in the arms it engages.

The levering handle $c$ has an inner forked end $c^2$ swinging loosely upon the centre pin $a^7$ of the boss $a^5$, and the boss and ratchet teeth of the segmental former $a$ are disposed between the branches of this forked end. A pawl $g$ is pivoted at $g^2$ within the forked end of the handle to engage the ratchet teeth $a^6$, and this pawl is spring-pressed into engagement by the leaf springs $h$. The ratchet teeth and pawl constitute a clutch between the handle and the former enabling said handle to be operated in varying positions relative to the former and the grip. The pawl is moved manually out of engagement with the ratchet teeth.

Assuming $x$ is a conduit tube laid in the ground, and it is desired to put a bend in it, the appliance is applied to the tube in the manner already described and the tube serves as a bending abutment, said tube being a stationary feature, and the longitudinal pull on the tube will tighten the wedge $d^3$ in the fork. Fig. 7 shows a bracket which may be fixed to a bench or the like and comprising two similar sides $s$ between which the levering handle, former, and fork are mounted about the bearing $s^2$, a centre pin $a^7$ long enough to extend through the side plates $s$ and the boss $a^5$ being utilized for this purpose. In this arrangement the bracket forms the bending abutment for the stresses, and the tube would rest against a cross-bar $s^3$ extending through the side members $s$.

It will be seen from the drawings that the former is removable from the levering handle, so that various shapes and sizes of formers may be used, but, generally speaking, for ordinary electrical conduit work one size of appliance would be sufficient, as the invention is designed primarily as a tool for a workman's kit for use in bending tubes and rods while in place.

Having now described our invention what we claim and desire to secure by Letters Patent is:—

1. A pipe bending appliance comprising a substantially segmental shaped former having a groove engageable with the pipe to be bent and having a boss, the former being rotatable on an axis passing through said boss, a grip including parallel arms carried by said former and extending radially of the axis of rotation of said former and constituting an open-ended fork to straddle the pipe, means carried by said fork and adapted to engage said pipe substantially diametrically of the point at which the pipe is engaged by said former, and means closing the end of said fork and upon which said pipe engaging means rests.

2. A pipe bending appliance comprising a substantially segmental shaped former having a groove engageable with the pipe to be bent and having a boss, the former being rotatable on an axis passing through said boss, a grip including parallel arms carried by said former and extending radially of the axis of rotation of said former and constituting an open-ended fork to straddle the pipe, means carried by the free end of said fork for engaging said pipe substantially diametrically opposite the point at which the pipe is engaged by said former, said pipe engaging means being shiftable in a direction substantially parallel to a line tangential to said former at the point of contact of said former with the pipe for adjustably varying the space between said former and said pipe engaging means, and means closing the end of said fork and upon which said pipe engaging means rests.

3. A pipe bending appliance comprising a substantially segmental shaped former having a groove engageable with one side of the pipe to be bent and having a boss, the former being rotatable on an axis passing through said boss, a grip including parallel arms carried by said former and extending radially of the axis of rotation of said former and constituting an open-ended fork to straddle the pipe, means carried in the end of the fork and engaging the pipe substantially diametrically opposite the point at which the pipe is engaged by said former, said pipe engaging means being shiftable in a direction substantially parallel to a line tangential to said former at the point at which the former contacts with the pipe for adjustably varying the space between said former and said pipe engaging means, and removable means closing the end of the fork and upon which the pipe engaging means rests.

4. A pipe bending appliance comprising a substantially segmental shaped former having a groove engageable with the pipe to be bent and having a boss, the former being rotatable on an axis passing through said boss, a grip including parallel arms carried by said former and extending radially of the axis of rotation of the former and constituting an open-ended pipe-straddling fork, means carried by said fork adjacent the end thereof for engaging the pipe substantially diametrically opposite to the point at which the pipe is engaged by the former, means bridging the end of said fork and upon which said pipe engaging means rests, said pipe engaging means being shiftable independently of said bridging means in a direction substantially parallel to a line tangential to said former at the point at which the former engages the pipe.

5. A pipe bending appliance comprising a substantially segmental shaped former having a groove engageable with one side of the pipe to be bent and having a boss, the former being rotatable on an axis passing through said boss, a grip including parallel arms carried by said former and extending radially of the axis of rotation of said former and constituting an open-ended pipe-straddling fork, a wedge carried by said fork adjacent the end of the latter to engage the pipe substantially diametrically opposite the point at which the pipe is engaged by said former, said wedge being shiftable in a direction substantially parallel to a line tangential to the former at the point at which the former contacts with the pipe for adjustably varying the space between said former and said pipe engaging means, and means bridging the end of said fork and upon which said wedge rests.

6. A pipe bending appliance comprising a substantially segmental shaped former having a central boss and a peripheral groove engageable with the pipe to be bent, said former being rotatable on an axis passing through said boss, a grip carried by said former and including parallel arms extending radially of the axis of rotation of said former and constituting an open-ended pipe-straddling fork, means carried by said fork to engage said pipe at a point opposite the point of engagement of said former with said pipe, means bridging the end of said fork and upon which said pipe engaging means rests, said boss being formed with ratchet teeth, a levering handle mounted to rock on an axis co-axial with the axis of rotation of said former, and a pawl carried by said handle and engageable with said ratchet teeth.

In testimony whereof we have hereunto set our hands in presence of two subscribing witnesses.

WILLIAM SCHONFIELD.
CHARLES LOUIS NORTH.

Witnesses:
GEORGE T. FUERY,
JOHN P. FUERY.